United States Patent
Dang et al.

(10) Patent No.: US 7,839,588 B1
(45) Date of Patent: Nov. 23, 2010

(54) METHOD OF ALTERNATING TRACK WRITE FOR DEFECT IDENTIFICATION

(75) Inventors: Dean V. Dang, Fountain Valley, CA (US); Kek Ming Chua, Rancho Santa Margarita, CA (US); Philip Bernard Saram, Kuala Lumpur (MY); William J. Seamon, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 263 days.

(21) Appl. No.: 12/122,710

(22) Filed: May 18, 2008

(51) Int. Cl.
  *G11B 27/36* (2006.01)
  *G11B 5/09* (2006.01)
(52) U.S. Cl. .......................... 360/31; 360/53
(58) Field of Classification Search .............. 360/31, 360/25
  See application file for complete search history.

(56) References Cited

U.S. PATENT DOCUMENTS

| | | | |
|---|---|---|---|
| 5,150,050 A | 9/1992 | Genheimer et al. | |
| 5,216,655 A | 6/1993 | Hearn et al. | |
| 5,280,395 A | 1/1994 | Matsuzaki | |
| 5,895,438 A | 4/1999 | Yomtoubian | |
| 6,104,556 A * | 8/2000 | Schaenzer et al. | 360/25 |
| 6,219,814 B1 | 4/2001 | Coker et al. | |
| 6,223,303 B1 * | 4/2001 | Billings et al. | 714/8 |
| 6,239,931 B1 | 5/2001 | Chung et al. | |
| 6,301,679 B1 * | 10/2001 | Tan | 714/723 |
| 6,366,081 B1 | 4/2002 | Tan et al. | |
| 6,384,999 B1 | 5/2002 | Schibilla | |
| 6,405,342 B1 | 6/2002 | Lee | |
| 6,606,211 B1 | 8/2003 | Lim et al. | |
| 6,691,255 B1 | 2/2004 | Rothberg et al. | |
| 6,704,153 B1 | 3/2004 | Rothberg et al. | |
| 6,731,442 B2 | 5/2004 | Jin et al. | |
| 6,940,669 B2 | 9/2005 | Schaenzer et al. | |
| 6,950,967 B1 | 9/2005 | Brunnett et al. | |
| 7,072,129 B1 * | 7/2006 | Cullen et al. | 360/31 |
| 7,215,619 B1 * | 5/2007 | Van Den Enden | 369/53.15 |
| 2001/0046196 A1 | 11/2001 | McKernan | |
| 2004/0153949 A1 | 8/2004 | Ro et al. | |
| 2006/0056088 A1 | 3/2006 | Kudoh et al. | |
| 2006/0126204 A1 | 6/2006 | Taniguchi et al. | |
| 2007/0089031 A1 | 4/2007 | Huffman et al. | |

\* cited by examiner

*Primary Examiner*—Daniell L Negrón
*Assistant Examiner*—Regina N Holder (57) ABSTRACT

Defects are identified in a disk drive by first writing a pattern of tracks to a disk surface in the disk drive, the pattern of tracks including written tracks alternating with unwritten tracks. The written tracks of the pattern of tracks are read, and a defect in a portion of a first written track is detected. An unread portion of a first unwritten track is then identified as comprising a defect based at least in part on the defect in the first written track, the first unwritten track located proximate the first written track.

27 Claims, 6 Drawing Sheets

METHOD OF ALTERNATING TRACK WRITE FOR DEFECT IDENTIFICATION

BACKGROUND

Magnetic disk drives are conventionally designed to store large volumes of data on a plurality of disks mounted on a spindle assembly. Typically, each disk includes two disk surfaces capable of storing data. On each disk surface, user data is divided into groups of sectors and stored in concentric circular tracks located between an outside diameter and inside diameter of the disk. Embedded servo information is recorded in servo sectors located in radially continuous narrow wedges along the disk surface.

As a result of the manufacturing process, defective locations may exist on the disk surfaces. To prevent these defective locations from being inadvertently accessed by an end user, a defect discovery procedure may be performed to locate these defects and mark them as defective before the disk drives are shipped. Defect discovery is often performed after the servo sectors have been written to the disk surfaces. A typical defect discovery procedure includes writing a known data pattern to all of the tracks of a disk surface and subsequently reading the data pattern from the disk surface. Defective locations are then identified by comparing the data pattern read from the disk surface with the known data pattern.

Following the defect discovery procedure, information indicative of the defective locations is stored in a defect list (often stored as a table). The defect list may then be used during formatting of the disk surface, wherein the defective locations may be mapped to data sector locations (e.g., cylinder number, head number, and data sector number (referred to as a "CHS address")). Once identified in the defect list, the defective locations may not be used for storing data.

Unfortunately, as the storage capacity of disk drives has increased, so to has the process time required for the defect discovery procedure. This increased process time has in turn increased the cost of manufacturing disk drives.

There is therefore a need in the art for more rapid and efficient identification of defects in disk drives both during and after manufacturing.

DETAILED DESCRIPTION

Figure 1:
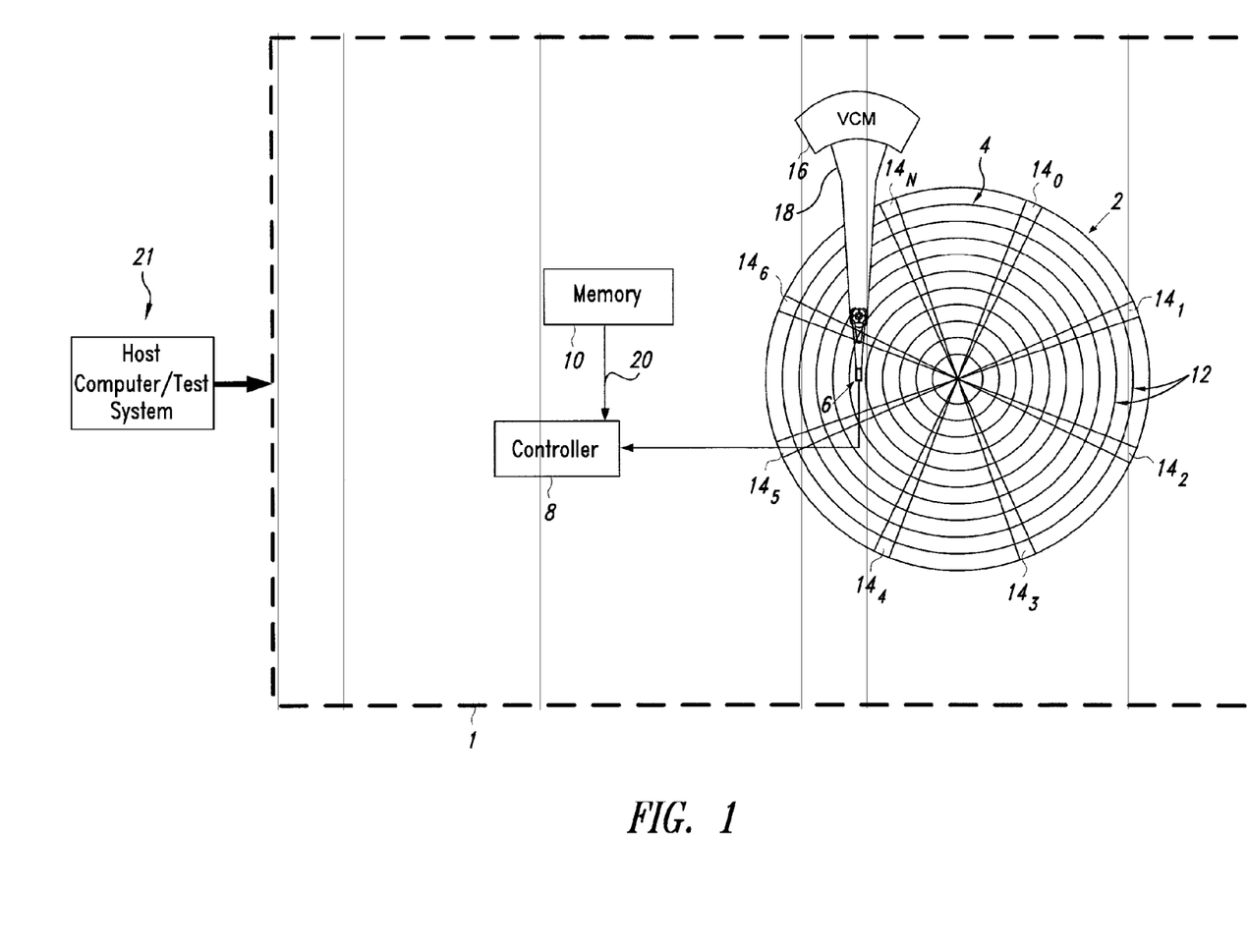
FIG. 1 is a schematic view generally illustrating an example disk drive, according to one illustrated embodiment.

Referring to FIG. 1, according to one embodiment, disk drive 1 comprises a disk 2 having a disk surface 4, a head 6 actuatable over the disk surface 4 and operable to write to and read from the disk surface 4, a controller 8 operable to execute instructions, and a memory 10 having computer-readable instructions stored thereon that are executable by the controller 8. In one embodiment, the instructions stored on the memory 10 may cause the controller 8 to identify defects in the disk surface 4 by: writing a pattern of tracks to the disk surface 4, the pattern of tracks including written tracks alternating with unwritten tracks; reading the written tracks of the pattern of tracks; detecting a defect in a portion of a first written track; and identifying an unread portion of a first unwritten track as comprising a defect based at least in part on the defect in the first written track, the first unwritten track located proximate the first written track.

As illustrated herein, the disk drive 1 comprises a magnetic disk drive, and the methods described herein will be described in terms of such a disk drive. However, the methods, circuitry and devices described herein may also be applied to and/or implemented in other disk drives, including, e.g., optical and magneto-optical disk drives.

The disk 2 may comprise any of a variety of magnetic or optical disk media. In one embodiment, the disk 2 comprises perpendicular magnetic recording media. As illustrated, the disk 2 includes a disk surface 4, as well as an opposite disk surface not visible in FIG. 1. In one embodiment, the disk surface 4 comprises a plurality of generally concentric tracks 12 defined at least in part by a plurality of servo sectors $14_{0-N}$. In one embodiment, the plurality of tracks 12 may initially have no data stored therein. For example, the illustrated disk surface 4 may include the servo sectors $14_{0-N}$ but may not include data written between the servo sectors $14_{0-N}$.

In other embodiments, more disks may, of course, be included in the disk drive 1, and different disk surfaces of these disks may be used for data storage. The methods described herein may be applied to one or more of these disk surfaces and, in some embodiments, may be performed concurrently to multiple disk surfaces.

The head 6 is actuatable over the disk surface 4 and is operable to write to and read from the disk surface 4. In one embodiment, the head 6 is a perpendicular magnetic recording head and includes a transducer (not illustrated). The transducer may include a writer and a read element. In magnetic recording applications, the transducer's writer may be of a longitudinal, tunneling or perpendicular design, and the read element of the transducer may be inductive or magneto-resistive. In optical or magneto-optical recording applications, the head 6 may include an objective lens and an active or passive mechanism for controlling a separation of the objective lens from the disk surface 4.

As illustrated, the disk drive 1 may further include a voice coil motor (hereinafter referred to as a "VCM") 16 for rotating one or more actuator arms 18 about a pivot in order to actuate the head 6 at different positions over the disk surface 4. Of course, other actuating mechanisms may also be used to move the head 6 relative to the disk surface 4.

The controller 8 is configured to execute one or more instructions in order to control certain operations performed by the disk drive 1. For example, the controller 8 may interpret disk access commands received from a host computer and based on such commands may determine which data to send to or receive from a read channel. The controller 8 may also perform error correction and detection routines on data read from the disk surface 4. In one embodiment, a processing unit of the controller 8 is configured to execute instructions stored on the memory 10, which is communicatively coupled thereto by at least one data line 20.

The memory 10 may comprise any type of volatile or nonvolatile computer-readable memory, such as dynamic random access memory (DRAM) or flash memory. As illustrated, the memory 10 comprises a memory module separate and distinct from the disk surface 4. However, in other embodiments, various instructions executable by the controller 8 may be stored on the disk surface 4.

The memory 10 may have a variety of information stored thereon. This stored information may include: data read from the disk surface 4, data representative of operating parameters of the disk drive 1, and op codes of control programs for controlling operations performed by the controller 8. In one embodiment, as set forth above, the memory 10 may store instructions that are executable by the controller 8 in order to cause the controller 8 to identify defects in the disk surface 4 by performing a number of steps enumerated and discussed in detail with respect to FIG. 3.

As shown in FIG. 1, the disk drive 1 is communicatively coupled to a host computer or test system 21. In one embodiment, a host computer 21 coupled to the disk drive 1 may comprise a typical personal computer or server computing system, within which the disk drive 1 may be incorporated. In another embodiment, a test system 21 used in the manufacturing process of the disk drive 1 may be communicatively coupled thereto. For example, the disk drive 1 may be communicatively coupled to an XCALIBRE system, sold by Xyratex Technology, Ltd.

Figure 2:
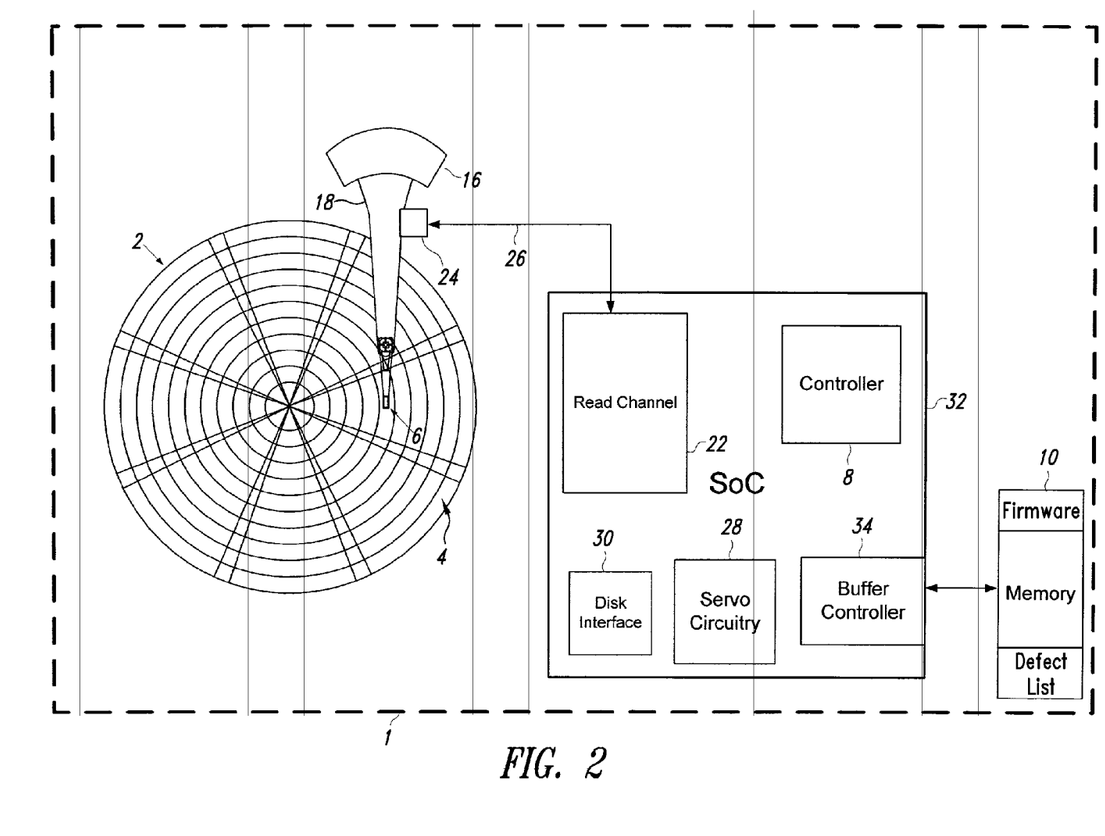
FIG. 2 is a schematic view illustrating in greater detail the example disk drive of FIG. 1, according to one illustrated embodiment.

Referring to FIG. 2, additional circuitry for controlling various functions of the disk drive 1 is illustrated in greater detail. However, in other embodiments, any or all of the illustrated circuitry may be omitted.

As illustrated in FIG. 2, the disk drive 1 may further include a read channel 22. The read channel 22 may be coupled to a preamplifier 24 via a plurality of read and write lines 26. The preamplifier 24 may be located on the actuator 18 within the disk drive 1, or at a variety of other locations. During a read operation, the preamplifier 24 may amplify an analog signal detected by the head 6 in order to achieve a signal level that can be processed by the read channel 22. The read channel 22 may then receive the amplified signal via one of the lines 26 and further amplify, filter and convert the analog pulses into digital data that is output to the controller 8. During a write operation, the read channel 22 may receive digital data from the controller 8 and forward logical signals representative of this digital data to the preamplifier 24 via the lines 26.

The disk drive 1 may further comprise servo circuitry 28. In one embodiment, the servo circuitry 28 receives a position signal via the preamplifier 24 and the read channel 22 and performs calculations to determine a current position of the head 6 over the disk surface 4. The servo circuitry 28 then uses these calculations in order to control the VCM 16, and thereby control the position of the head 6.

Disk drive 1 may further include a disk interface 30 that mediates communication with the host computer or test system 21. In one embodiment, the disk interface 30 receives commands and data from and transmits status and data to the host computer or test system 21. The disk interface 30 may comply with any of a number of electrical engineering standards. In one embodiment, the disk interface 30 may include a serial interface, such as a Serial Advanced Technology Attachment ("SATA") interface or a Serial Attached Small Computer System Interface ("SAS"). In another embodiment, a parallel interface may be used, such as an Advanced Technology Attachment/Integrated Drive Electronics ("ATA/IDE") interface or a Small Computer System Interface ("SCSI").

The disk drive 1 may further comprise a buffer controller 34 directly coupled to the memory 10. The buffer controller 34 arbitrates access to the memory 10 by other circuit components. As illustrated, the memory 10 may include firmware and other instructions executable by the controller 8, as well as a defect list.

As illustrated, many of the circuit components may be incorporated into a system on a chip ("SoC") 32. Thus, a single piece of silicon may incorporate the functionality of many of the above-described components. In other embodiments, the circuit components described herein may be implemented on a printed circuit board ("PCB") as separate elements.

Figure 3:
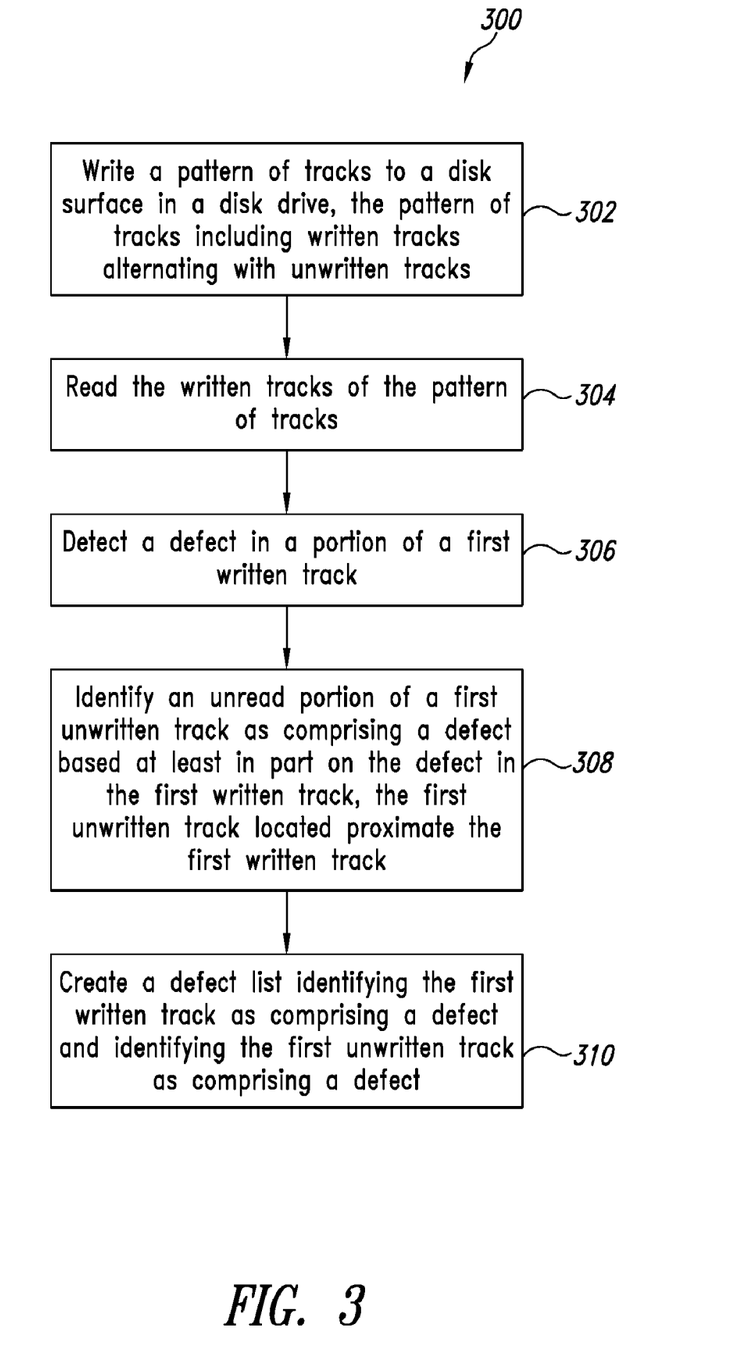
FIG. 3 is a flow diagram illustrating a method for identifying defects in a disk drive, according to one illustrated embodiment.

FIG. 3 illustrates a flow diagram for a method 300 of identifying defects in a disk drive, according to one embodiment. This method 300 will be discussed in the context of the disk drive 1 of FIGS. 1 and 2 with reference to FIGS. 4-6, which illustrate an exemplary pattern of tracks that may be written to and read from the disk surface 4. However, it may be understood that the acts disclosed herein may be executed in a variety of different disk drives or host computer/test systems, in accordance with the described method.

As described herein, all of the acts comprising the method 300 may be orchestrated by the controller 8 based at least in part on computer-readable instructions stored in the memory 10. In other embodiments, all or some of the acts may be performed by the controller 8 based at least in part on computer-readable instructions stored in memory external from the disk drive 1. In other embodiments, all or some of the acts may be performed by an external processing unit based at least in part on computer-readable instructions stored in the memory 10 or in memory external from the disk drive 1. In still other embodiments, a hardware implementation of all or some of the acts of the method 300 may be used to identify defects in the disk surface 4.

At act 302, a pattern of tracks is written to a disk surface 4 in a disk drive 1, the pattern of tracks including written tracks alternating with unwritten tracks. The pattern of tracks may comprise any non-zero number of consecutive written tracks alternating with any non-zero number of consecutive unwritten tracks. This pattern of tracks may then be repeated across at least a portion of the disk surface 4 and, in one embodiment, may be repeated across the entirety of the disk surface 4 that is accessible by the head 6. This pattern of tracks may also be repeated on the other disk surface of the disk 2 or on other disks in the disk drive 1.

In one embodiment, the pattern of tracks may not be consistent across the disk surface 4. For example, a first number of written tracks may alternate with a second number of unwritten tracks near an outer diameter of the disk surface 4, while a third number of written tracks may alternate with a fourth number of unwritten tracks near an inner diameter of the disk surface 4. As another example, the pattern of tracks may be relatively complex: such as a pattern comprising two consecutive written tracks followed by one unwritten track followed by one written track followed by two consecutive unwritten tracks. The pattern of tracks may be selected based on defect characteristics, head offset characteristics or track characteristics, which may vary radially across the disk surface 4.

Figure 4:
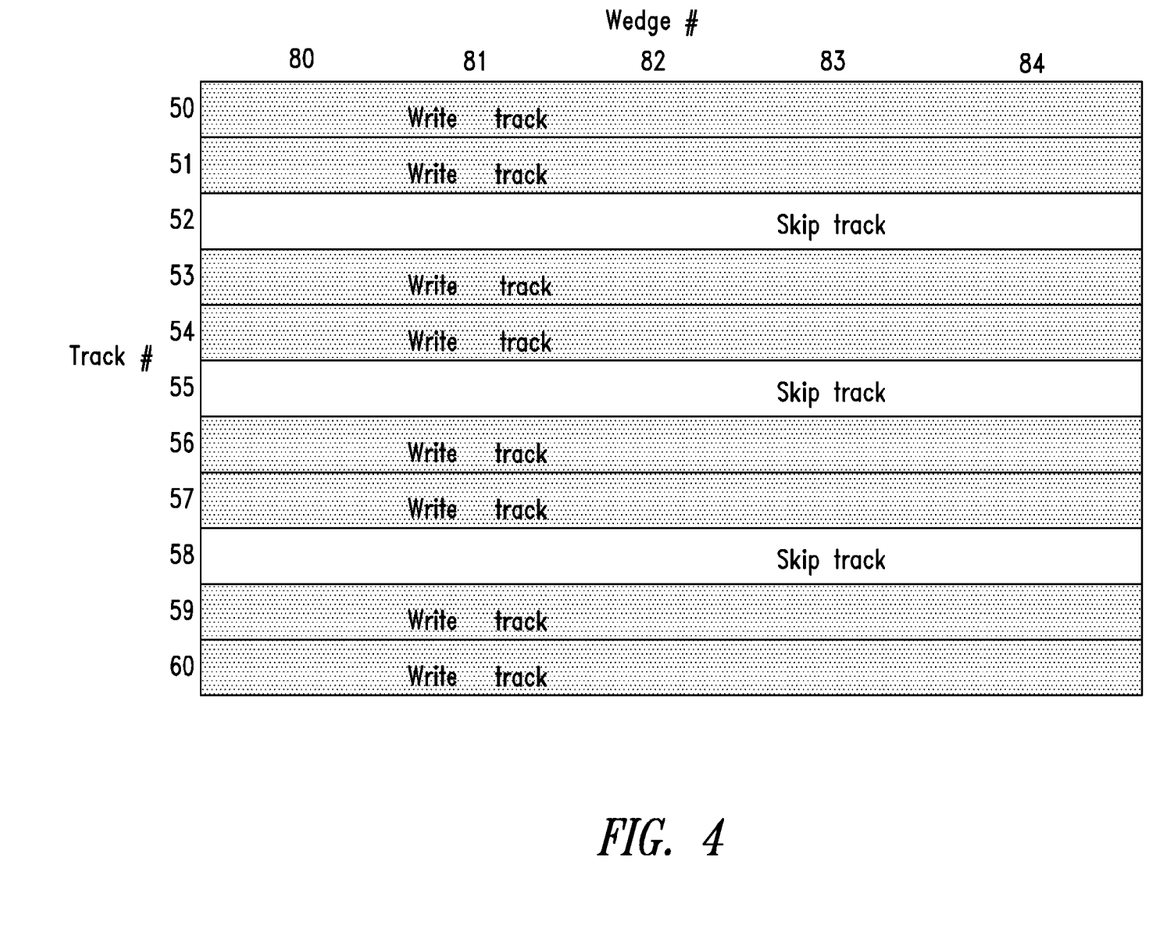
FIG. 4 is a schematic view of an example pattern of tracks written to the disk drive of FIG. 1, according to one illustrated embodiment.

One exemplary pattern of tracks is illustrated in FIG. 4. As illustrated therein, two consecutive written tracks alternate with a single unwritten track across the disk surface 4. Thus, rather than writing to 100% of a disk surface, only 67% of the tracks defined by the disk surface 4 are written. As illustrated in FIG. 4, the tracks may be numbered radially across the disk surface 4, and wedges defined between servo sectors may also be numbered circumferentially around the disk surface 4.

Other patterns of tracks may also be employed. In one embodiment, a single written track may alternate with a single unwritten track. In such an embodiment, only 50% of the tracks defined by the disk surface 4 are written. In another embodiment, three consecutive written tracks may alternate with two consecutive unwritten tracks. In such an embodiment, only 60% of the tracks defined by the disk surface 4 are written. The pattern of tracks chosen in a particular embodiment may be selected based at least in part on manufacturing cycle demands, defect characteristics, track characteristics, media characteristics, head characteristics, etc. For example, due to the characteristics of perpendicular magnetic recording heads and media, it may be advantageous to use the pattern of tracks illustrated in FIG. 4.

In one embodiment, the pattern of tracks is written to the disk surface 4 by the head 6 based on instructions executed by the controller 8. That is, the controller 8 executes instructions stored on the memory 10 in order to direct other disk drive components of the disk drive (such as the servo circuitry 28 and the read channel 22) to write the pattern of tracks to the disk surface 4. The instructions stored on the memory 10 may include settings indicative of the characteristics of the pattern of tracks. For example, the memory 10 may store variables indicative of the number of consecutive written tracks and the number of consecutive unwritten tracks. These variables may then be modified by the host computer or test system 21 based on characteristics of the disk drive 1.

In another embodiment, the host computer or test system 21 may more directly control the pattern of tracks written to the disk surface 4. For example, the controller 8 may receive write commands from the host computer or test system 21 that cause the controller 8 to write the pattern of tracks to the disk surface 4. In such an embodiment, changes to the software executed by the host computer or test system 21 may be made to modify the pattern of tracks based on characteristics of the disk drive 1. In yet another embodiment, the pattern of tracks may be written to the disk surface 4 under control of an external controller before integration of the disk 2 into the disk drive 1. For example, the pattern of tracks may be written to the disk surface 4 soon after a servo writing process.

The unwritten tracks described above may not remain unwritten over the life of the disk drive 1 but may be used to store data after execution of the method 300 described herein. Instead, the unwritten tracks are simply skipped during the act 302 wherein select tracks across a substantial portion of the disk surface 4 (or the entire disk surface 4) are written.

The data pattern written to each of the written tracks may comprise any of a variety of data patterns. In one embodiment, a 2T pattern is written to the written tracks. The 2T pattern comprises a period of alternating polarity two times a minimum bit time. Thus, the 2T pattern may prove particularly useful for identifying defects in the disk surface 4. Of course, in other embodiments, other data patterns may be written to the disk surface 4 in order to identify defects therein.

Figure 5:
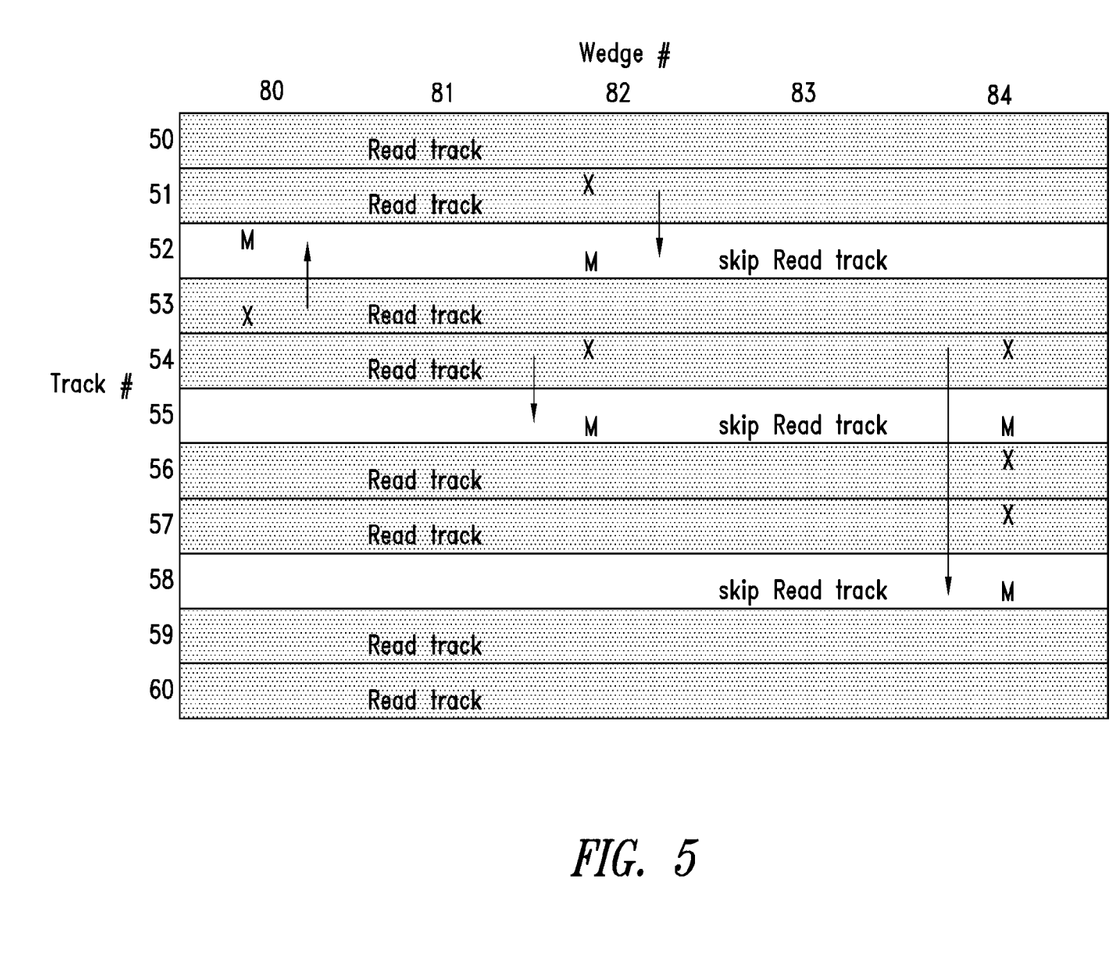
FIG. 5 is a schematic view of the pattern of tracks of FIG. 3 after a read operation, written and unwritten tracks of the pattern of tracks including a plurality of defects, according to one illustrated embodiment.
Figure 6:
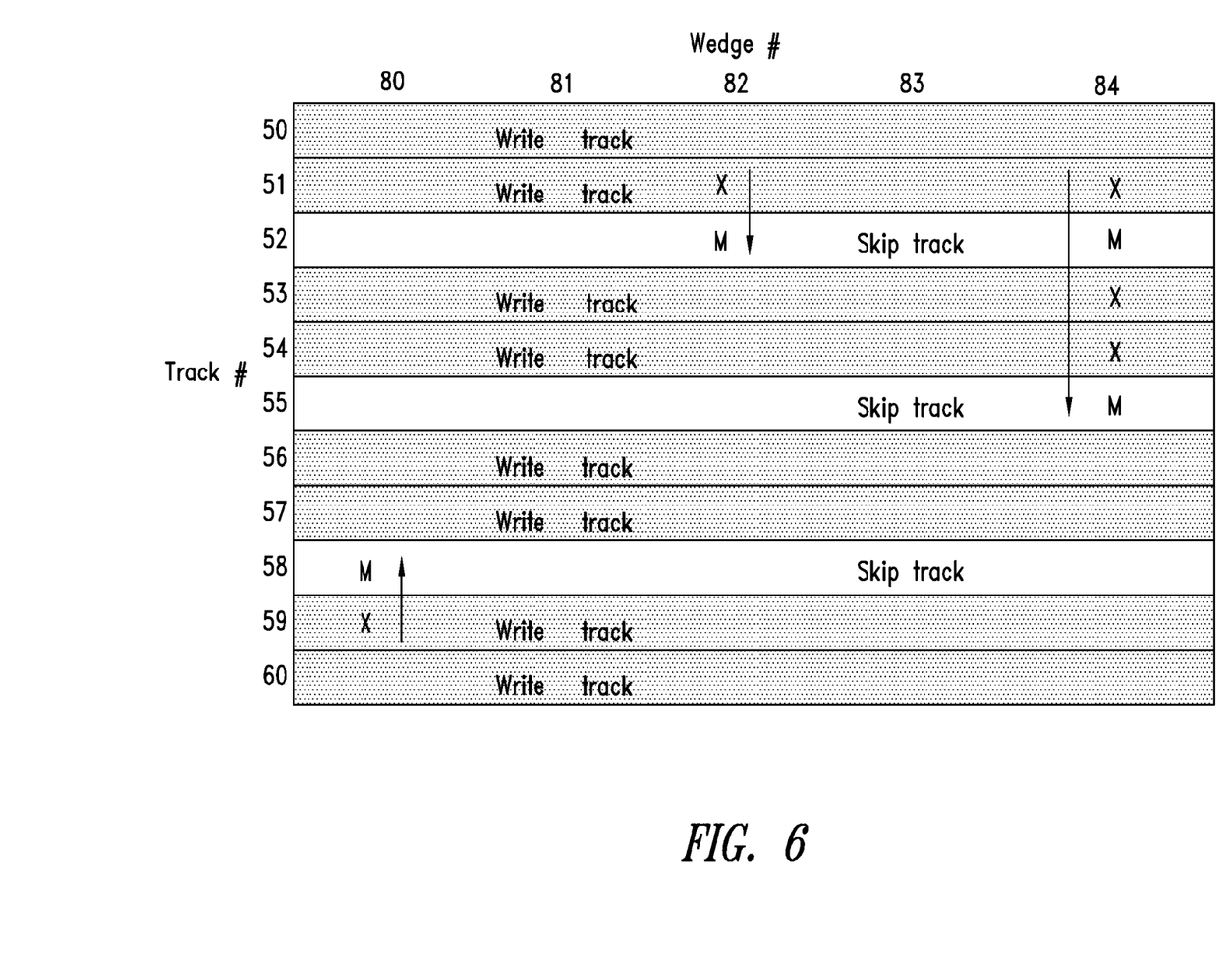
FIG. 6 is a schematic view of the pattern of tracks of FIG. 3 after a write operation, written and unwritten tracks of the pattern of tracks including a plurality of defects, according to one illustrated embodiment.

At act 304, the written tracks of the pattern of tracks are read. The pattern of tracks may be read as illustrated in FIG. 5, with the written tracks being read and the unwritten tracks skipped. In one embodiment, the written tracks are read by the head 6 based on instructions executed by the controller 8. That is, the controller 8 executes instructions stored on the memory 10 in order to direct other disk drive components of the disk drive (such as the servo circuitry 28 and the read channel 22) to read the written tracks of the pattern of tracks from the disk surface 4.

In another embodiment, the host computer or test system 21 may more directly control the reading operation of the written tracks. For example, the controller 8 may receive read commands from the host computer or test system 21 that cause the controller 8 to read the written tracks from the disk surface 4. In yet another embodiment, the written tracks may be read from the disk surface 4 under control of an external controller before integration of the disk 2 into the disk drive 1.

At act 306, a defect is detected in a portion of a first written track. The defect may be detected in any portion of the first written track, including in a servo portion (e.g., in a servo sector) or in a data area of the first written track. The defect may also have any of a variety of causes, including media defects, head-media incompatibilities, track squeeze caused by the servo writing process, head strikes, contamination, etc. Examples of such defects are illustrated schematically in FIG. 5 by the X's.

In one embodiment, during the read operation of act 304, the defect is detected in a test pattern previously written to the first written track. That is, the defect may be detected in the portion of the first written track based on a difference in a test pattern read from the first written track with comparison to the known test pattern written to the first written track. The difference in the test pattern may then be logically associated with a defect in the disk surface 4. In one embodiment, any difference in the test pattern may identify a defect. In another embodiment, only a difference that is not resolved by conventional error correction techniques identifies a defect. In yet another embodiment, only a difference that is not resolved after multiple attempts to read the portion of the first written track is identified as a defect. Other mechanisms for detecting defects in the written tracks during a read operation may be used. For example, a defect may be detected in a servo sector based on the characteristics of the servo information read from the servo sector.

The defect detected in the portion of the first written track may have a variety of shapes and sizes. Similarly, the portion of the first written track identified as the location of the defect may also have varying sizes. In one embodiment, the portion of the first written track is identified by a wedge number and a track number. For example, as illustrated in FIG. 5, wedge number 82 of track number 51 comprises a defect, and wedge number 84 of track number 54 also comprises a defect. In another embodiment, the portion of the first written track may be identified by a future CHS address based on timing data, such that the defect is localized to a particular data sector. Other addressing mechanisms for locating the portion of the first written track may be used in other embodiments.

In another embodiment, the defect may be detected in the portion of the first written track while performing the write operation of act 302. Examples of defects detected during the write operation are illustrated schematically in FIG. 6 by the X's. In one embodiment, a defect may be detected in a servo portion of the first written track based on the characteristics of the servo information read from the servo portion during the write operation. Such defects may be localized to a single wedge (as illustrated) or may be detected across the entire track.

In one embodiment, the defect detection is performed by the controller 8 based on instructions stored on the memory 10. In another embodiment, the host computer or test system 21 may more directly control the defect detection. For example, the host computer or test system 10 may receive information indicative of a data pattern read by the controller 8 from the first written track and may perform its own comparison with a known data pattern in order to detect a defect. In yet another embodiment, an external controller may detect defects in the pattern of tracks before integration of the disk 2 into the disk drive 1. If too many defects are detected, the disk 2 may be discarded or reprocessed.

At act 308, an unread portion of a first unwritten track is identified as comprising a defect based at least in part on the defect in the first written track, the first unwritten track located proximate the first written track. Examples of such unread portions that are identified as comprising defects are illustrated schematically in both FIGS. 5 and 6 as M's. This reflects the fact that such portions are identified as comprising defects although no defects have been directly detected therein. Indeed, the unread portion of the first unwritten track may, in fact, not comprise a defect. However, many defects in the disk surface 4 span several tracks radially, and thus, by extrapolating from defects detected in the written tracks, the method 300 may identify at least some real defects in the unwritten tracks.

In one embodiment, an unwritten track located proximate a written track is not separated from the written track by any intervening tracks. For example, they may be numbered consecutively. In other embodiments, an unwritten track located proximate a written track may be separated from the written track by more than one intervening track, such as two or three intervening tracks.

In one embodiment, the identified unread portion of the first unwritten track is located at least approximately radially adjacent the defect detected in the first written track. For example, as illustrated in FIG. 5, identifying the unread portion of the first unwritten track may comprise identifying a portion of the first unwritten track that is in a same wedge as the portion of the first written track. As another example, identifying the unread portion of the first unwritten track may comprise identifying an unread data sector of the first unwritten track that is radially adjacent the defect in the first written track. Thus, defects extending across multiple tracks (as illustrated in wedge 84) may be identified in radially adjacent portions of the pattern of tracks.

In one embodiment, any unread portion of an unwritten track that is adjacent a defect detected in a written track may be identified as comprising a defect in accordance with the method 300. As illustrated in FIG. 5, unwritten tracks having track numbers greater than or less than proximate written tracks may be identified as comprising defects. In another embodiment, unwritten tracks that are more than one radial track away from written tracks in which defects have been detected may also be identified as comprising defects. For example, in a pattern comprising three consecutive written tracks alternating with two consecutive unwritten tracks, unread portions of two consecutive unwritten tracks may be identified as comprising defects even if a defect has only been detected in a single written track adjacent to one of the two unwritten tracks.

The unread portion of the first unwritten track identified as comprising a defect may have varying sizes. In one embodiment, the unread portion of the first unwritten track is identified by a wedge number and a track number. In another embodiment, the unread portion of the first unwritten track may be identified by a future CHS address, such that the defect is localized to a particular data sector. For example, using timing information associated with the defect detected in the first written track, a data sector of the first unwritten track that is radially adjacent the detected defect may be identified as comprising a defect.

The unread portion of the first unwritten track may or may not remain unread over the life of the disk drive 1. However, the unread portion of the first unwritten track is identified as comprising a defect without having been read.

In one embodiment, the above-described defect identification is performed by the controller 8 based on instructions stored on the memory 10. In another embodiment, the host computer or test system 21 may more directly control the defect identification. For example, the host computer or test system 21 may receive information indicative of a data pattern read by the controller 8 from the first written track and may perform its own extrapolation to identify the unread portion of the first unwritten track as comprising a defect.

At act 310, a defect list is created identifying the first written track as comprising a defect and identifying the first unwritten track as comprising a defect. As described above in one embodiment, a defect list may be used during formatting of the disk drive 1, wherein the defects may be mapped to wedge/track locations or data sector locations (e.g., CHS addresses). Once identified in the defect list, these locations may not be used for storing data. Thus, the defect list may include information indicative of a plurality of portions of the written tracks and the unwritten tracks of the pattern of tracks that are inaccessible by a user of the disk drive. In another embodiment, the defect list may be used to further test only the unwritten tracks that have been identified as having a defect to confirm that such tracks do contain a defect. In this manner, only the unwritten tracks that have been identified as having a high defect probability will be tested for defects.

In one embodiment, the controller 8 creates the defect list and stores the defect list in the memory 10 (as illustrated in FIG. 2). In another embodiment, the controller 8 may store the defect list on disk media, such as on the disk surface 4, and the defect list may be loaded into the memory 10 during initialization of the disk drive 1.

The defect list may include a variety of information for identifying the defect locations in the first written track and the first unwritten track. In one embodiment, the defect list may identify the entire first written track and the entire first unwritten track as comprising defects. In another embodiment, wedges of the first written track and the first unwritten track may be identified as comprising defects. In yet another embodiment, data sectors or even parts of data sectors may be identified as comprising defects.

In one embodiment, the defect list may be created by the controller 8 based on instructions stored on the memory 10. In another embodiment, the host computer or test system 21 may create the defect list, and then forward information indicative of the defect list to the disk drive 1 for storage and subsequent use.

The acts of method 300 described above may be initiated by the disk drive 1 itself, or may be initiated by the host computer or test system 21. In one embodiment, a test system, such as an XCALIBRE system, may command the disk drive 1 to perform the acts of the method 300 as part of a manufacturing process (and more specifically as part of an intelligent burn-in process) of the disk drive 1. In another embodiment, subsequent to the manufacturing process, a host computer may command the disk drive 1 to perform the acts of the method 300, in order to identify defects on one or more disk surfaces of the disk drive 1. In other embodiments, the disk drive 1 may automatically perform the acts of the method 300 during an initial formatting process or at any time after the disk drive 1 has been completely formatted.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

We claim:

1. A method of identifying defects in a disk drive, the method comprising:
writing a pattern of tracks to a disk surface in the disk drive, the pattern of tracks including written tracks alternating with unwritten tracks;
reading the written tracks of the pattern of tracks;
detecting a defect in a portion of a first written track; and
identifying an unread portion of a first unwritten track as comprising a defect based at least in part on the defect in the first written track, the first unwritten track located proximate the first written track.

2. The method of claim 1, wherein the pattern of tracks includes two consecutive written tracks alternating with one unwritten track.

3. The method of claim 1, wherein the pattern of tracks includes one written track alternating with one unwritten track.

4. The method of claim 1, wherein the pattern of tracks includes three consecutive written tracks alternating with two consecutive unwritten tracks.

5. The method of claim 1, wherein identifying the unread portion of the first unwritten track as comprising a defect includes identifying a portion of the first unwritten track that is in a same wedge as the portion of the first written track.

6. The method of claim 1, wherein identifying the unread portion of the first unwritten track as comprising a defect includes identifying an unread data sector of the first unwritten track that is radially adjacent the defect in the first written track.

7. The method of claim 1, wherein writing, reading, detecting, and identifying are performed as part of a manufacturing process of the disk drive.

8. The method of claim 1, further comprising creating a defect list identifying the first written track as comprising a defect and identifying the first unwritten track as comprising a defect.

9. The method of claim 8, wherein the defect list includes information indicative of a plurality of portions of the written tracks and the unwritten tracks that are inaccessible by a user of the disk drive.

10. The method of claim 1, wherein writing the pattern of tracks further includes writing a 2T pattern to each of the written tracks, the 2T pattern having a period of alternating polarity at two times a minimum bit time.

11. The method of claim 1, wherein detecting the defect in the portion of the first written track includes detecting a defect in a test pattern previously written to the first written track.

12. The method of claim 1, wherein detecting the defect in the portion of the first written track includes detecting the defect while writing the pattern of tracks.

13. The method of claim 12, wherein detecting the defect in the portion of the first written track includes detecting a defect in a servo portion of the first written track.

14. A disk drive comprising:
a disk having a disk surface;
a head actuatable over the disk surface, the head operable to write to and read from the disk surface;
a controller operable to execute instructions; and
a memory having instructions stored thereon that are executable by the controller in order to cause the controller to identify defects in the disk surface, by:
writing a pattern of tracks to the disk surface, the pattern of tracks including written tracks alternating with unwritten tracks;
reading the written tracks of the pattern of tracks;
detecting a defect in a portion of a first written track; and
identifying an unread portion of a first unwritten track as comprising a defect based at least in part on the defect in the first written track, the first unwritten track located proximate the first written track.

15. The disk drive of claim 14, wherein the pattern of tracks includes two consecutive written tracks alternating with one unwritten track.

16. The disk drive of claim 14, wherein the pattern of tracks includes one written track alternating with one unwritten track.

17. The disk drive of claim 14, wherein the pattern of tracks includes three consecutive written tracks alternating with two consecutive unwritten tracks.

18. The disk drive of claim 14, wherein identifying the unread portion of the first unwritten track as comprising a defect includes identifying a portion of the first unwritten track that is in a same wedge as the portion of the first written track.

19. The disk drive of claim 14, wherein identifying the unread portion of the first unwritten track as comprising a defect includes identifying an unread data sector of the first unwritten track that is radially adjacent the defect in the first written track.

20. The disk drive of claim 14, wherein the head is a perpendicular magnetic recording head.

21. The disk drive of claim 14, wherein the memory has further instructions stored thereon that are executable by the controller in order to cause the controller to create a defect list identifying the first written track as comprising a defect and identifying the first unwritten track as comprising a defect.

22. The disk drive of claim 21, wherein the defect list includes information indicative of a plurality of portions of the written tracks and the unwritten tracks that are inaccessible by a user of the disk drive.

23. The disk drive of claim 14, wherein writing the pattern of tracks further includes writing a 2T pattern to each of the written tracks, the 2T pattern having a period of alternating polarity at two times a minimum bit time.

24. The disk drive of claim 14, wherein detecting the defect in the portion of the first written track includes detecting a defect in a test pattern previously written to the first written track.

25. The disk drive of claim 14, wherein detecting the defect in the portion of the first written track includes detecting the defect while writing the pattern of tracks.

26. The disk drive of claim 25, wherein detecting the defect in the portion of the first written track includes detecting a defect in a servo portion of the first written track.

27. A disk drive comprising:
means for writing a pattern of tracks to a disk surface in the disk drive, the pattern of tracks including written tracks alternating with unwritten tracks;
means for reading the written tracks of the pattern of tracks;

means for detecting a defect in a portion of a first written track; and means for identifying an unread portion of a first unwritten track as comprising a defect based at least in part on the defect in the first written track, the first unwritten track located proximate the first written track.

* * * * *